United States Patent [19]

Bedard et al.

[11] Patent Number: 5,071,801

[45] Date of Patent: Dec. 10, 1991

[54] HIGH DENSITY LEUCITE BASED CERAMICS FROM ZEOLITE

[75] Inventors: Robert L. Bedard, Fishkill; Edith M. Flanigen, White Plains, both of N.Y.

[73] Assignee: UOP, Des Plaines, Ill.

[21] Appl. No.: 557,347

[22] Filed: Jul. 25, 1990

[51] Int. Cl.[5] .............................................. C04B 35/18
[52] U.S. Cl. .................................... 501/128; 501/153; 501/154; 423/328; 502/64; 502/67
[58] Field of Search .......................... 106/35; 423/328; 501/128, 153, 154; 502/64, 67

[56] References Cited

U.S. PATENT DOCUMENTS

| | | | |
|---|---|---|---|
| 4,503,023 | 5/1985 | Breck et al. | 423/328 |
| 4,604,366 | 8/1986 | Kacicz et al. | 501/6 |
| 4,798,536 | 1/1989 | Katz | 433/212.1 |
| 4,814,303 | 3/1989 | Chowdhry et al. | 501/119 |
| 4,840,779 | 6/1989 | Cannan | 423/328 |

FOREIGN PATENT DOCUMENTS 298701 11/1989 European Pat. Off. .

OTHER PUBLICATIONS

D. W. Breck, Zeolite Molecular Sieves, John Wiley & Sons, New York (1974) 493–496.

C. Hahn and K. Teuchert in Ber. Dt. Keram. Ger., 57, (1980) Nos. 9–10, 208–215.

*Primary Examiner*—Mark L. Bell
*Assistant Examiner*—Anthony J. Green
*Attorney, Agent, or Firm*—Thomas K. McBride; Eugene I. Snyder; Frank S. Molinaro

[57] ABSTRACT

This invention relates to processes for preparing ceramic articles. One process involves taking a potassium exchanged zeolite, the zeolite characterized in that it has a $SiO_2/Al_2O_3$ ratio of 3.5 to about 7.5, and calcining it at a temperature of about 900° to about 1100° C. for a time sufficient to collapse the zeolite framework and provide an amorphous powder. Next, the amorphous powder is formed into a shaped article and the article is sintered at a temperature of about 1150° to about 1400° C. for a time of about 0.5 to about 12 hours to give a ceramic article whose principal crystalline phase is tetragonal leucite, is substantially crack free, and has less than 5% porosity. When the zeolite is exchanged with cesium, one obtains a ceramic article whose principal crystalline phase is pollucite, when a rubidium exchanged zeolite is used one obtains a ceramic article whose principal crystalline phase is rubidium leucite, and when a potassium/cesium exchanged zeolite is used one obtains a ceramic article having as its principal crystalline phase a leucite/pollucite solid solution. The addition of pollucite to the leucite article provides a ceramic article whose thermal expansion coefficient can be varied from about $2 \times 10^{-6}$ to about $27 \times 10^{-6} °C^{-1}$ as measured over the range 50°–700° C. This invention also relates to this leucite/pollucite ceramic article.

29 Claims, No Drawings

HIGH DENSITY LEUCITE BASED CERAMICS FROM ZEOLITE

BACKGROUND OF THE INVENTION

Ceramic articles have many uses including catalyst supports, dental porcelain, heat exchangers, turbine blades, substrates for integrated circuits, etc. The particular ceramic which is used in a given application depends on the properties required for the given application. For example, leucite ceramics can be used as dental porcelains, coatings for metals and metal/ceramic seals. A review of the importance of potassium aluminosilicate compositions in dental ceramics is given in C. Hahn and K. Teuchert in Ber. Dt. Keram. Ges., 57, (1980) Nos. 9–10, 208–215. One drawback to the use of leucite in dental applications is that it is fragile and hard to repair. For this reason, dental restorations usually require a metal framework. Accordingly, there is a need for a leucite ceramic with higher strength. There is also a need for a process which can form a leucite ceramic at lower temperatures so that the processes of high temperature glass melting followed by fritting and milling are eliminated.

U.S. Pat. No. 4,798,536 teaches the addition of potassium salts to various feldspars to produce a porcelain having a greater amount of a leucite phase and increased strength. Applicants have produced a partially crystallized leucite glass ceramic, with strengths greater than those reported in the '536 reference, by taking a potassium exchanged zeolite Y powder and heating it at a temperature of about 1050° C. to give an amorphous powder. This amorphous powder is then formed into a desired shape and sintered at a temperature of about 1150°–1400° C. to give a leucite ceramic article. Thus, glass melting and preparation of frits are unnecessary.

Although the prior art describes the preparation of ceramics from zeolites, there is no report of a process to make a dense leucite ceramic article. For example, D. W. Breck in ZEOLITE MOLECULAR SIEVES, John Wiley & Sons, New York (1974), pp. 493–496 states that Mg-X can be heated to form cordierite. The disclosed process involves heating the Mg-X zeolite at 1500° C. to form a glass and then heating the glass above 1000° C. to form cordierite. Thus, two steps are required to form cordierite.

Another reference which teaches the preparation of a cordierite based ceramic article is U.S. Pat. No. 4,814,303 to Chowdry et al. Chowdry discloses producing a monolithic anorthite, anorthite-cordierite or cordierite based ceramic article by heating the Ca, Ca/Mg and Mg forms of zeolites X, Y and A at a temperature of about 900° C. to about 1350° C. Example 33 of Chowdry discloses preparing a potassium exchanged zeolite X followed by sintering at 1000° C., thereby forming predominantly $KAlSi_2O_6$ which supposedly showed the X-ray diffraction pattern of leucite (JCPDS File No. 15–47).

Finally, European Patent Publication Number 298,701 (to Taga et al.) describes the preparation of a ceramic article having an anorthite phase from a calcium zeolite. The process involves a calcination to form an amorphous product which can then be shaped into an article and sintered at temperatures of about 850°–950° C.

Applicants' process differs considerably from this prior art. First, the instant process is a two-step process whereas Chowdry discloses a one-step process. As the examples herein show, a two step process is critical for producing usable ceramic articles. Second, the type of zeolites used and sintering conditions used in the instant process are completely different from that in the Taga reference.

The process of this invention can also be used to produce ceramic articles whose principal crystalline phase is pollucite. Pollucite ceramic articles can be used in applications where there is a need for low thermal shock and high refractoriness since pollucite has a coefficient of thermal expansion of less than $2 \times 10^{-6}$ °C.$^{-1}$ over the temperature range 50°–700° C., and has a melting point of greater than 1900° C. This type of ceramic article can be produced by using a cesium exchanged zeolite instead of a potassium exchanged zeolite and sintering at a temperature of about 1250° C.

Another drawback to leucite in certain applications is it has a large coefficient of thermal expansion. Leucite goes through a phase change (from tetragonal to cubic) at a temperature between 400° and 600° C. which results in a unit cell volume increase of about 5%. Even at temperatures below this structural transition, leucite and its glass ceramics show relatively large thermal expansion coefficients. The prior art describes that thermal expansion in leucite glass ceramics can be varied over a somewhat narrow range by changing the ratio of leucite crystals to residual glass in the sintered ceramic. This method of thermal expansion variation is described in U.S. Pat. No. 4,604,366, which teaches that thermal expansion can be adjusted over a range of $10 \times 10^{-6}$ to $19 \times 10^{-6}$ by blending two different glass frits with two different pulverized glass ceramic powders in varying ratios.

Applicants have also discovered a process by which the coefficient of thermal expansion of the leucite can be varied from about $2 \times 10^{-6}$ to about $27 \times 10^{-6}$ °C.$^{-1}$ in the 50° to 700° C. temperature range.

The coefficient can be varied by introducing a pollucite phase into the leucite ceramic. Pollucite is a relatively low thermal expansion cesium-silica-alumina ceramic which has the cubic high-leucite structure at room temperature and forms a continuous series of solid solutions with leucite over the full subsolidus temperature range. As the cesium level in the leucite ceramic is increased the thermal expansion coefficient decreases to a point that the leucite/pollucite assumes the high leucite cubic structure at room temperature, after which time the coefficient of expansion continues to decrease with increased cesium content.

The leucite/pollucite ceramic article can be made by exchanging a zeolite such as zeolite Y with both potassium and cesium and then following the process described above. By varying the amounts of potassium and cesium content in the starting zeolite and processing as described above, one can obtain any desired leucite/pollucite solid solution. The use of a potassium and cesium exchanged zeolite as the starting material provides a uniform distribution of these cations in the starting zeolite which in turn results in a homogeneous distribution of these cations in the ceramic article. By varying the amounts of cesium and potassium in the starting zeolite, the thermal expansion coefficient of the ceramic article can be "tuned" to whatever value is desired between the coefficients given above. Thus, the instant process greatly simplifies the control of the coefficient of thermal expansion over that found in the prior art and allows a wider range of the thermal expansion coefficient to be attained.

SUMMARY OF THE INVENTION

This invention relates to a process for preparing a ceramic article whose principal crystalline phase is tetragonal leucite, a process for preparing a ceramic article whose principal crystalline phase is pollucite, a process for preparing a ceramic article whose principal crystalline phase is rubidium leucite, a process for preparing a ceramic article whose principal crystalline phase is a leucite/pollucite solid solution and to a ceramic article comprising a leucite/pollucite solid solution. Accordingly, one embodiment of the invention is a process producing a substantially crack free ceramic article having less than 5% porosity and whose principal crystalline phase is tetragonal leucite comprising calcining a powder of a potassium exchanged zeolite, the zeolite having a $SiO_2/Al_2O_3$ ratio of about 3.5 to about 7.5, at a temperature of about 900° to about 1100° C. for a time effective to collapse the zeolite framework and provide an amorphous powder, forming the amorphous powder into a shaped article and sintering the shaped article at a temperature of about 1150° to about 1400° C., for a time of about 0.5 to about 12 hours, thereby forming said ceramic article.

Another embodiment of the invention is a process for producing a substantially crack free ceramic article having less than 5% porosity and whose principal crystalline phase is a leucite/pollucite solid solution, comprising calcining a powder of a potassium and cesium co-exchanged zeolite or a powder of a potassium only exchanged zeolite and a cesium only exchanged zeolite at a temperature of about 900° to about 1100° C. for a time effective to collapse the zeolite framework and provide an amorphous powder, the zeolite having a $SiO_2/Al_2O_3$ of about 3.5 to about 7.5, has a potassium content of greater than zero but less than 100% of the ion exchange capacity of the zeolite, a cesium content of greater than zero but less than 100% of the ion exchange capacity of the zeolite and the sum of the potassium and cesium content is at least 50% of the total ion exchange capacity of the zeolite; forming the amorphous powder into a shaped article and sintering the shaped article at a temperature of about 1150° to about 1400° C., for a time of about 0.5 to about 12 hours, thereby forming said ceramic article.

Yet another embodiment of the invention is a process for producing a substantially crack free ceramic article having less than 5% porosity and whose principal crystalline phase is pollucite comprising calcining a powder of a cesium exchanged zeolite having a $SiO_2/Al_2O_3$ ratio of about 3.5 to about 7.5 at a temperature of about 900° to about 1100° C. for a time effective to collapse the zeolite framework and provide an amorphous powder, forming the amorphous powder into a shaped article and sintering the shaped article at a temperature of about 1150° to about 1400° C., for a time of about 0.5 to about 12 hours, thereby forming said ceramic article.

A further embodiment of the invention is a substantially crack free ceramic article having less than 5% porosity, having as its principal crystalline phase a leucite/pollucite solid solution having an empirical formula expressed in terms of the metal oxides:

$$xK_2O:yCs_2O:zSiO_2:Al_2O_3$$

where x varies from about 0.01 to about 0.99, y varies from about 0.99 to about 0.01 and z varies from about 3.5 to about 7.5 except that when z is 7.5, y is greater than 0.19, the ceramic article characterized in that it has a coefficient of thermal expansion of about $2\times10^{-6}$ to about $27\times10^{-6}$°C.$^{-1}$ over the range 50° to 700° C.

Other objects and embodiments of this invention will become more apparent in the following detailed description.

DETAILED DESCRIPTION OF THE INVENTION

As stated, this invention relates to a process for preparing ceramic articles whose principal crystalline phase is tetragonal leucite from a potassium exchanged zeolite, a process for preparing a ceramic article whose principal crystalline phase is a leucite/pollucite solid solution from a potassium/cesium exchanged zeolite, a process for preparing a ceramic article whose principal crystalline phase is pollucite from a cesium exchanged zeolite, a process for preparing a ceramic article whose principal crystalline phase is rubidium leucite from a rubidium exchanged zeolite, and a ceramic article comprising a leucite/pollucite solid solution. Accordingly, one necessary component of the process of this invention is a zeolite. Zeolite are well known microporous three-dimensional framework structures. In general the crystalline zeolites are formed from corner sharing $AlO_2$ and $SiO_2$ tetrahedra and are characterized as having pore openings of uniform dimensions, having a significant ion-exchange capacity and being capable of reversibly desorbing an adsorbed phase which is dispersed throughout the internal pores or voids of the crystal without displacing any atoms which make up the permanent crystal structure.

Zeolites can be represented on an anhydrous basis, by the formula $$M_{2/n}O:Al_2O_3:XSiO_2$$

where M is a cation having the valence n and X is generally equal to or greater than 2. In naturally occurring zeolites, M can be Li, Na, Ca, K, Mg and Ba. The M cations are loosely bound to the structure and frequently can be completely or partially replaced with other cations by conventional ion exchange techniques.

The zeolites which can be used in this invention include any zeolite which can be synthesized with a $SiO_2/Al_2O_3$ ratio between 3.5 and 7.5. It is also necessary that the cation present in the zeolite be exchangeable with potassium, cesium, rubidium or a mixture of potassium and cesium. Illustrative of the zeolites which have these properties are zeolite Y, zeolite L, zeolite LZ-210, zeolite B, zeolite omega, zeolite LZ-202, and zeolite W. Zeolite LZ-210 is a zeolite Y whose silicon content has been increased by treatment with aqueous ammonium fluorosilicate $((NH_4)_2SiF_6)$. The preparation and characterization of this zeolite is described in U.S. Pat. No. 4,503,023 which is incorporated by reference. Zeolite LZ-202 is an omega-type zeolite prepared without a templating agent, whose preparation is disclosed in U.S. Pat. No. 4,840,779 which is incorporated by reference. Of these zeolites, zeolite Y, L, B, W, and omega are preferred.

In the description which follows, zeolite Y will be used to exemplify the process. However, this is not to be construed as limiting the invention in any way to zeolite Y.

Zeolite Y is a synthetic zeolite having the formula $Na_2O:Al_2O_3:xSiO_2$ where x ranges from about 3 to about 6. The synthesis of zeolite Y is described in U.S. Pat. No. 3,130,007 which is incorporated by reference. The synthesis essentially entails forming a mixture of sodium aluminate, sodium silicate, colloidal silica and sodium hydroxide heating this mixture at a temperature of about 20° to 175° C. under autogenous pressure for a time sufficient to ensure complete crystallization, usually about 16 to 40 hours and isolating the product.

Two techniques are generally used to remove the sodium cation or other cation and replace it with potassium, cesium, rubidium or a mixture of potassium and cesium. One technique is a multiple ion exchange with the potassium cation while the other technique involves pre-exchanging the zeolite with a cation such as $NH_4^+$ followed by ion exchange with the potassium ion.

Ion exchange is conveniently carried out by contacting the zeolite with an aqueous solution of the metal ion to be exchanged. For example, a dilute (about 1 molar) aqueous solution of potassium chloride or potassium nitrate is prepared and the pH of the solution adjusted to about 8.5 using potassium hydroxide. The volume of solution which is prepared is that amount which provides from about 5 to about 10 times the amount of potassium ion needed to fully ion exchange the sodium or other unwanted alkali metal in the zeolite.

The contacting of the potassium salt solution with the zeolite can conveniently be carried out in a batch process. Accordingly, the solution is mixed with the zeolite powder and the mixture is refluxed for about 2 hours. Next the mixture is filtered, thereby isolating the zeolite powder. This procedure is repeated with a fresh batch of solution until the potassium content is at least 50% and preferably at least 90% of the ion exchange capacity of the zeolite. The ion exchange capacity for a zeolite in units of moles/g is defined as the moles/g of aluminum in the framework when a monovalent cation is being exchanged into the zeolite. Alternatively, the potassium exchange can be carried out using a continuous process employing methods well known in the art such as placing the zeolite in a column and flowing the potassium solution through the column or using a basket centrifuge. A continuous process has the advantage of allowing a more efficient utilization of the potassium solution.

The potassium exchanged zeolite Y is now calcined, i.e., heated in air, at a temperature of about 900° to about 1100° C. and preferably at about 1000° to about 1075° C. for a time of about 0.5 to about 2 hours. This calcination collapses the zeolite framework and produces an amorphous powder which, when formed into a ceramic article (a green or unsintered article) has a higher density than if the uncalcined zeolite were used. The effect of this calcination step is that cracks and warping in the finished ceramic article are minimized or eliminated, i.e., the finished article is substantially crack and warp free.

During the calcination agglomeration of the zeolite may occur. It is preferred that the calcined or amorphous powder be sieved and only the powder which goes through a 60 mesh U.S. Standard Sieve (250 micron opening) be used to prepare the ceramic powder. Of course the powder can be milled using conventional milling means such as ball milling, attrition milling, impact milling, etc. in order to reduce the particle size to 60 mesh or less. A powder with smaller particles will produce a ceramic article with fewer cracks and allow for more facile processing.

The amorphous powder is now formed into a desired shape by means well known in the art. A typical method of forming a shaped article involves placing the zeolite powder into a metal die and then pressing the powder at pressures of about 500 to about 50,000 psi (3,440 to about 344,000 kPa).

It is also desirable to add a binder to the powder as an aid in forming the shaped article. The binder may be selected from those well known in the art such as polyvinyl alcohol, and polyethylene glycol. If a binder is added, the amount which is to be added is up to about 15 weight percent of the powder.

Having formed the potassium exchanged zeolite Y into a desired shape (green article), the green article is now sintered at a temperature of about 1150° C. to about 1400° C. and preferably at a temperature of about 1200° C. to about 1300° C. for a time of about 2 to about 6 hours. The resultant ceramic article obtained after sintering has been found to have as its principal crystalline phase tetragonal leucite. By principal is meant that at least 90% of the crystalline phase of the article is leucite. The ceramic article which is obtained is substantially crack free and has less than 5% porosity. By substantially crack-free is meant that no cracks are visible to the naked eye. Porosity can be measured by conventional techniques such as microstructure analysis by Scanning Electron Microscopy or Transmission Electron Microscopy.

A ceramic article containing pollucite as its principal crystalline phase can be prepared in a analogous way to that described for a leucite ceramic article. Thus a zeolite is exchanged using a cesium salt, e.g., cesium nitrate following the procedure outlined above for potassium exchange. The amount of cesium to be exchanged should be at least 50% and preferably at least 90% of the ion exchange capacity of the zeolite. The cesium exchanged zeolite is processed in the same manner as the potassium exchanged zeolite powder described above to produce a ceramic article with its principal crystalline phase being pollucite.

In an analogous manner a zeolite can be exchanged with rubidium instead of potassium or cesium. Rubidium exchange is carried out in the same manner as potassium or cesium exchange except that a rubidium chloride or rubidium nitrate solution is used. Next, the rubidium exchanged zeolite is processed in the same way as described for the potassium exchanged zeolite to produce a ceramic article having as its principal crystalline phase a rubidium leucite phase.

As stated, this invention also relates to a process for preparing a ceramic article whose principal crystalline phase is in a leucite/pollucite solid solution. By varying the amount of pollucite in the article, one can vary the coefficient of thermal expansion over a range from about $2 \times 10^{-6}$ to about $27 \times 10^{-6}$°C.$^{-1}$ in the temperature range of 50° to 700° C. In preparing a ceramic article composed of a leucite/pollucite solid solution a zeolite, such as zeolite Y, is first exchanged to obtain the potassium form as described above and then exchanged with a cesium salt such as cesium chloride, cesium hydroxide or cesium nitrate. When both potassium and cesium are present in the zeolite, i.e. co-exchanged, the potassium content is greater than zero but less than 100% of the ion exchange capacity of the zeolite and the cesium content is greater than zero but less than 100% of the ion exchange capacity of the zeolite and the sum of the potassium and cesium content is at least 50% and preferably at least 90% of the ion exchange capacity of the zeolite. As the amount of cesium in the zeolite increases, the coefficient of thermal expansion decreases. Therefore, by varying the concentration of potassium and cesium one obtains a process for controlling the thermal expansion coefficient of a leucite/pollucite solid solution containing ceramic article.

Once the zeolite containing both potassium and cesium is obtained, it is processed as described above to obtain a ceramic article having as its principal phase a leucite/pollucite solid solution. Instead of using one zeolite that has been exchanged with both potassium and cesium, one can use two zeolite powders (either the same structure type or different structure type), one exchanged with only potassium and one exchanged with only cesium and blending the two zeolite powders to achieve the desired ratio of potassium and cesium which leads to the desired ratio of leucite and pollucite. The amounts of potassium and cesium present are the same as in the co-exchanged case. Although both methods can be used, they do not necessarily give the same results. Thus, it is preferred that one zeolite powder that contains both potassium and cesium be used.

The leucite/pollucite ceramic article can be described in terms of the metal oxides by the empirical formula $$xK_2O:yCs_2O:zSiO_2:Al_2O_3$$

where x varies from about 0.01 to about 0.99, y varies from about 0.99 to about 0.01 and z varies from about 3.5 to about 7.5, except that when z is 7.5, y is greater than 0.19. The ceramic article is characterized in that it has a coefficient of thermal expansion of about $2 \times 10^{-6}$ to about $27 \times 10^{-6}$°C.$^{-1}$ over the range 50° to 700° C., has less than 5% porosity and is extremely refractory, i.e., has a melting point greater than 1450° C. Finally, the principal crystalline phase of the ceramic article is a leucite/pollucite solid solution. The leucite/pollucite ceramic articles of this invention have several uses including dental porcelains, metal/ceramic seals where the coefficient of thermal expansion can be graded in the transition zone between the metal and ceramic.

In order to fully illustrate the instant invention, the following examples are set forth. It is to be understood that the examples are only by way of illustration and are not intended as an undue limitation on the broad scope of the invention as set forth in the appended claims.

EXAMPLE 1

This example shows the preparation of potassium exchanged zeolite Y from NaY zeolite. In a container 223.7 grams of KCl were dissolved in 3 liters of distilled water and the pH of the solution was adjusted to 8.5 by adding a small amount of KOH. To this solution there were added 150 g. of NaY zeolite, prepared according to the procedure in U.S. Pat. No. 3,130,007, whose chemical analysis was: 19.52 wt. % $Al_2O_3$, 41.45 wt. % $SiO_2$ 12.82 wt. % $Na_2O$ and 26.21 wt. % LOI. The chemical formula expressed as ratio of oxides on an anhydrous basis was determined to be: 1.08 $Na_2O$:1.00 $Al_2O_3$:3.61 $SiO_2$. The resulting slurry was heated to reflux while stirring for two hours.

The zeolite powder was isolated by filtration, after which the powder was reexchanged three more times, each time with equal amounts of freshly prepared KCl solution (adjusted to pH 8.5 as above), followed by another filtration. Finally the powder was washed with 9 liters of distilled water. The resulting powder was dried at room temperature. Elemental analysis showed the presence of: 20.2 wt. % $Al_2O_3$, 41.0 wt. % $SiO_2$, 0.188 wt. % $Na_2O$, 17.0 wt. % $K_2O$ and 22.2 wt. % LOI. The chemical formula expressed as the ratio of the oxides on an anhydrous basis was determined to be: 0.02 $Na_2O$:0.91 $K_2O$:1.0 $Al_2O_3$:3.4 $SiO_2$.

EXAMPLE 2

A 53.3 lb. sample of LZ-Y62 (ammonium exchanged Y zeolite with nominally 2.7 wt. % residual $Na_2O$ and $SiO_2/Al_2O_3$ about 5; obtained from UOP) was slurried in a solution of 360 lb of $H_2O$ and 40 lb. of $NH_4Cl$. The mixture was refluxed for 1 hour, then filtered in a filter press, after which the powder was left in the filter press for the remainder of the ion exchanges. A new solution of 40 lb. of $NH_4Cl$ in 360 lb of $H_2O$ was prepared and heated to reflux in a kettle which was fitted with piping to the filter press. The hot solution was circulated through the filter press containing the zeolite powder for two hours, while recycling through the heated kettle in order to keep the solution as close to reflux temperature as possible. Three more exchanges were carried out by the above circulation procedure, each time with equal amounts of freshly prepared $NH_4Cl$ solution. Finally, the zeolite powder, while still in the filter press, was washed with about 75 gallons of $H_2O$. The resulting wet powder was removed from the filter press and dried overnight at 100° C. Elemental analysis showed the presence of: 17.8 wt. % $Al_2O_3$, 51.7 wt. % $SiO_2$, 8.7 wt. % $(NH_4)_2O$, 0.31 wt. % $Na_2O$, and 29.7 wt. % LOI. The chemical formula expressed as the ratio of the oxides on an anhydrous basis was determined to be:

$$0.03\ Na_2O:\ 1.0\ Al_2O_3:\ 4.9\ SiO_2:\ 0.96\ (NH_4)_2O.$$

EXAMPLE 3

A 500 g. portion of ammonium exchanged zeolite Y prepared in example 2, was exchanged as follows. In a container 1011.1 g. of $KNO_3$ was dissolved in 10 liters of $H_2O$, and the pH was adjusted to about 9 with a small amount of KOH. The zeolite powder was slurried in the solution and then the mixture was heated, with stirring, to reflux for 2 hours. The zeolite powder was isolated by filtration, after which the powder was reexchanged three more times, each time with equal amounts of freshly prepared $KNO_3$ solution (adjusted to pH 9 as above).

Finally, the powder was washed with 15 liters of distilled water and dried in air at room temperature. Elemental analysis showed the following composition: 16.4 wt. % $Al_2O_3$, 48.0 wt. % $SiO_2$, 14.5 wt. % $K_2O$, and 21.0 wt. % LOI, which can be expressed as the following ratio of anhydrous oxides: 0.96 $K_2O$: 1.0 $Al_2O_3$: 5.0 $SiO_2$.

EXAMPLE 4A

This example shows the preparation of ceramic pellets using potassium exchanged zeolite Y made as in Example 3. Two pellets were formed by placing about 1 gram portions of potassium exchanged zeolite Y into 0.5 inch (1.27 cm) diameter steel dies and pressing at 10,000 psi. The two pellets were heated at 6° C./minute to 1050° C. and held at 1050° C. for 4 hours. The densities of the fired pellets, which were white and chalky and clearly not sintered, were 1.55 and 1.55 g/cc. One of the pellets was ground into a fine powder and analyzed by X-ray diffraction which indicated that the pellet was amorphous.

EXAMPLE 4B

This example shows the preparation of ceramic pellets using potassium exchanged zeolite Y made as in Example 3. Two pellets were formed by placing about 1 gram portions of the potassium exchanged zeolite Y into 0.5 inch (1.27 cm) diameter pellet dies and pressing at 10,000 psi. The two pellets were heated at 6° C./minute to 1150° C. and held at 1150° C. for 4 hours. The densities of the sintered pellets, which were glassy and a light gray color, were 2.31 and 2.32 g/cc. One of the pellets was ground into a fine powder. X-ray diffraction analysis of the powder indicated that the ceramic was amorphous.

EXAMPLE 4C

Two more pellets were made as in Example 4A above using the same potassium exchanged zeolite powder. The pellets were heated at 6° C./minute to 1150° C. and held at 1150° C. for 12 hours. The sintered densities of the two pellets, which were similar in appearance to the pellets in Example 4A above, were 2.32 and 2.29 g/cc. X-ray analysis of one of the pellets after grinding revealed the presence of tetragonal leucite (JCPDS File No. 15-47).

EXAMPLE 4D

A pellet was formed by placing approx. 25 grams of potassium exchanged zeolite Y, made as in example 3, into a 2.25 inch diameter steel die and pressing at 3000 psi. The green pellet was 57.15 mm in diameter. The pellet was heated at 10° C. per minute to 1050° C., then at 4° C. per minute to 1250° C., and held at 1250° C. for 4 hours. The resulting sintered pellet was severely cracked. A measurement of the diameter from a small uncracked area was 39.3 mm, indicating a 31% shrinkage in the pellet diameter.

EXAMPLE 4E

A small rectangular pellet of a potassium exchanged zeolite Y prepared as in Example 3 and measuring 0.26" in length was loaded into a horizontal recording dilatometer, with the longest dimension used as the measured axis of shrinkage The pellet was heated at 6° C. per minute to 1400° C. The sintered pellet had a final length of 0.19", representing a 27% linear shrinkage. The pellet was ground into a fine powder and analyzed by X-ray powder diffraction which showed the presence of tetragonal leucite, as in Example 4B above.

Examples 4A to 4E show that preparing ceramic articles in one step gives very unsatisfactory results. Leucite begins to form only after heating at 1150° C. for 12 hours. Additionally, the green articles (pellets) shrink considerably upon sintering (at least 27% shrinkage).

EXAMPLE 5A

About 5 grams of potassium exchanged zeolite Y made as in Example 3, was heated as a loose powder to 1050° C. for one hour. Six pellets were made by pressing the precalcined powder in a 0.5 inch steel dies at 10,000 psi. The heating rate used for the following experiments was 4° C. per minute. Three pairs of pellets were heated for 4 hours at 1150° C., 1250° C., and 1350° C. respectively. The average densities of the sintered pellets for the three processing temperatures were 2.31, 2.35, and 2.39 g/cc respectively. One pellet from each pair was ground into a fine powder and analyzed by x-ray diffraction. The x-ray patterns of the three powders revealed the following crystalline phases, as referenced to the respective sintering temperatures: 1150° C.-tetragonal leucite; 1250° C.-tetragonal leucite; 1350° C.-tetragonal leucite. The leucite glass ceramic processed at 1250° C. showed the highest degree of crystallinity.

EXAMPLE 5B

Approximately 100 g. of potassium exchanged zeolite Y prepared as in example 3, was heated as a loose powder at 10° C. per minute to 1050° C. and held at 1050° C. for 1 hour. About 45 grams of the calcined powder was loaded into a circular steel, 57.15 mm, die and pressed into a pellet at 3000 psi. Similarly about 9 grams of the powder were loaded into a steel 82.55 by 9.5 mm die and pressed at 4,000 psi. The pellets were then heated in a furnace at 10° C. per minute to 1050° C. then at 4° C. per minute to 1250° C., then held at 1250° C. for 4 hours. This heating schedule was identical to the one used in example 4D above. The resulting parts showed minimal warping and were crack-free. The circular pellet had a diameter of 44.95 mm and a density of 2.37 g/cc, while the rectangular bar had a length of 66 mm and a density of 2.26 g/cc.

The linear shrinkages, resulting during sintering, for these ceramic parts derived from precalcined powders were 20-21%, which are significantly less than parts made from uncalcined powder, which typically show 27-33% shrinkage. The degree of shrinkage in parts made from uncalcined powders essentially precludes the consistent production of crack-free, unwarped ceramics, while the use of precalcined powders allows for facile production of strong defect-free parts.

EXAMPLE 5C

The rectangular bar made in Example 5B above was cut to a length of 2.0 (50.8 mm) inches using a diamond grit cutoff wheel. The shorter piece which was obtained was ground into a fine powder and submitted for x-ray analysis. The x-ray revealed the presence of tetragonal leucite as the only crystalline phase.

The 2.0 inch piece was loaded into a recording dilatometer. The bar was heated at approximately 4° C. per minute to 800° C. The calculated average coefficient of thermal expansion over the 50°-700° C. range, corrected with a standard $Al_2O_3$ reference, was $26.7 \times 10^{-6}$° $C.^{-1}$. The tetragonal to cubic (low to high leucite) transformation was centered at about 410° C. in the dilatometer trace.

EXAMPLE 6A

A small rectangular pellet of potassium exchanged zeolite Y, made in Example 1, was prepared by pressing the powder in a rectangular die at 5000 psi. The long dimension of the pellet was 0.272 inch. The pellet was loaded into a recording dilatometer with its long dimension parallel to the measuring axis, then heated at 6° C. per minute to 1350° C. The sintered pellet had a final length of 0.181 inch, indicating a linear shrinkage of 33%. The pellet was ground into a fine powder and analyzed by x-ray diffraction, which confirmed that the only crystalline component was tetragonal leucite.

EXAMPLE 6B

About 15 grams of potassium exchanged zeolite Y, made in example 1, was heated as a loose powder to 1000° C. for 1 hour. An 82.55 mm rectangular bar was made from the calcined powder in a steel die, as in example 5A. The bar was heated at 10° C. per minute to 1000° C., then 4° C. per minute to 1250° C., then held at 1250° C. for 4 hours. The resulting bar was cut with a diamond cutoff wheel to a length of 2.0 inches. The measured density of the two inch bar was 2.36 g/cc. The short piece which was cut off was ground into a fine powder and analyzed by x-ray diffraction. The x-ray pattern revealed the presence of tetragonal leucite.

The two inch bar was loaded into an automatic recording dilatometer and was heated at about 4° C. per minute to 900° C.

The calculated average coefficient of thermal expansion over the 50°–700° C. range, corrected with a standard $Al_2O_3$ reference, was $28.0 \times 10^{-6°}$ $C.^{-1}$. The tetragonal to cubic (low to high leucite) transformation was not well defined in this ceramic composition, but was indicated by subtle slope changes in the dilatometer trace between 500° and 650° C.

EXAMPLE 7

This example shows the preparation of a cesium and potassium exchanged zeolite. A 100 gram portion of a potassium exchanged zeolite Y, prepared as in Example 3, was exchanged with cesium as follows. In a container 331.35 g. of cesium nitrate was dissolved in 1.7 liters of water, then the pH was adjusted to 8 with a small amount of $CsCO_3$. The zeolite powder was slurried in the solution and the mixture was heated with stirring to reflux for two hours. The powder was isolated by filtration, after which the powder was reexchanged two more times as above, each time with equal amounts of freshly prepared pH adjusted $CsNO_3$ solutions. The final powder was isolated by filtration, washed with 15 liters of deionized water, and dried in air at room temperature. Elemental analysis revealed the presence of: 14.1 wt. % $Al_2O_3$, 41.4 wt. % $SiO_2$, 3.01 wt. % $K_2O$, 27.2 wt. % $Cs_2O$, and 15.8 wt. % LOI, which can be expressed in anhydrous oxide ratios as 0.70 $Cs_2O$: 0.23 $K_2O$: 1.0 $Al_2O_3$: 4.95 $SiO_2$.

EXAMPLE 8A

About 5 grams of the cesium and potassium exchanged zeolite Y, made in Example 7 was heated as a loose powder to 1050° C. for one hour. Six pellets were made by pressing the precalcined powder in 0.5 inch steel dies at 10,000 psi. The heating rate used for the following experiments was 4° C. per minute. Three pairs of pellets were heated for 4 hours at 1150° C. 1250° C., and 1350° C. respectively. The average densities of the sintered pellets for the three processing temperatures were 2.71, 2.76, and 2.77 g/cc respectively. One pellet from each pair was ground into a fine powder and analyzed by x-ray diffraction. The x-ray patterns of the three powders revealed the following crystalline phases, as referenced to the respective sintering temperatures: 1150° C.-amorphous, 1250° C.-pollucite (cubic leucite), 1350° C.-pollucite (cubic leucite).

EXAMPLE 8B

About 15 grams of cesium, potassium exchanged zeolite Y, made in Example 7, was heated as a loose powder to 1050° C. for 1 hour. The powder was passed through a standard 60 mesh screen to remove large agglomerates, then a 82.55×9.5 mm rectangular bar was made from the calcined, meshed powder in a steel die. The bar was heated at 10° C. per minute to 1050° C., then 4° C. per minute to 1250° C., then held at 1250° C. for 4 hours. The resulting bar, which was crack free, was cut with a diamond cutoff wheel to a length of 2.0 inches. The measured density of the two inch bar was 2.73 g/cc. The short piece which was cut off was ground into a fine powder and analyzed by x-ray diffraction. The x-ray pattern revealed the presence of cubic leucite.

The two inch bar was loaded into an automatic recording dilatometer and was heated at about 4° C. per minute to 875° C.

The calculated average coefficient of thermal expansion over the 50°–700° C. range, corrected with a standard $Al_2O_3$ reference, was $4.47 \times 10^{-6}/°$ $C.^{-1}$. No structural transition was apparent in the dilatometer trace.

EXAMPLE 9

A 50 gram portion of potassium exchanged zeolite Y, prepared as in example 3 was exchanged as follows. In a container 7.14 g. of cesium chloride was dissolved in 212.5 ml. of water, then the pH was adjusted to 7.5 with a small amount of $CsCO_3$. The zeolite powder was slurried in the solution and the mixture was heated with stirring to reflux for two hours. The powder was isolated by filtration and washed chloride free with deionized water and dried in air at room temperature. Elemental analysis revealed the presence of: 15.18 wt. % $Al_2O_3$, 10.9 wt. % $K_2O$, and 8.9 wt. % $Cs_2O$, indication that the cation ratio within the exchanged zeolite was 78% K and 22% Cs.

EXAMPLE 10

About 10 grams of the potassium and cesium exchanged zeolite Y, prepared in example 9, were heated as a loose powder at 10° C. per minute to 1050° C. for 1 hour. A 82.55×9.5 mm rectangular bar was made from the calcined powder in a steel die. The bar was heated at 10° C. per minute to 1050° C., then 4° C. per minute to 1250° C., then held at 1250° C. for 4 hours. The resulting bar, which was crack-free, was cut with a diamond cutoff wheel to a length of 2.0 inches. The measured density of the two inch bar was 2.49 g/cc. The short piece which was cut off was ground into a fine powder and analyzed by x-ray diffraction. The x-ray pattern revealed the presence of high tetragonal leucite.

The two inch bar was loaded into an automatic recording dilatometer and was heated at about 4° C. per minute to 775° C.

The calculated average coefficient of thermal expansion over the 50°–700° C. range, corrected with a standard $Al_2O_3$ reference, was $14.1 \times 10^{-6}/°$ $C.^{-1}$. No structural transition was apparent in the dilatometer trace.

EXAMPLE 11

A potassium zeolite L identified as product number 3069,and whose analysis in anhydrous oxide ratios was: 1.1 $K_2O$: 1.0 $Al_2O_3$: 6.4 $SiO_2$ was obtained from UOP. About 5 grams of this sample was heated as a loose powder to 1050° C. for one hour. Six pellets were made by pressing the precalcined powder in a 0.5 (12.7 mm)

inch steel dies at 10,000 psi. The heating rate used for the following experiments was 4° C. per minute. Three pairs of pellets were heated for 4 hours at 1150° C., 1250° C., and 1350° C. respectively. The densities of the sintered pellets were difficult to measure due to significant viscous flow during the sintering. One pellet from each pair was ground into a fine powder and analyzed by x-ray diffraction. The x-ray patterns of the three powders revealed the following crystalline phases, as referenced to the respective sintering temperatures: 1150° C.-tetragonal leucite, 1250° C.-tetragonal leucite, 1350° C.-tetragonal leucite.

We claim as our invention:

1. A process for producing a substantially crack free ceramic article having less than 5% porosity and whose principal crystalline phase is tetragonal leucite comprising calcining a powder of a potassium exchanged zeolite, the zeolite having a $SiO_2/Al_2O_3$ ratio of about 3.5 to about 7.5, at a temperature of about 900° to about 1100° C. for a time effective to collapse the zeolite framework and provide an amorphous powder, forming the amorphous powder into a shaped article and sintering the shaped article at a temperature of about 1150° to about 1400° C., for a time of about 0.5 to about 12 hours, thereby forming said ceramic article.

2. The process of claim 1 where the sintering is carried out at a temperature of about 1200° C. to about 1300° C.

3. The process of claim 1 where the zeolite is selected from the group consisting of zeolite Y, zeolite B, zeolite L, zeolite W and zeolite omega.

4. The process of claim 3 where the zeolite is zeolite Y.

5. The process of claim 1 where the amount of potassium in the potassium exchanged zeolite is at least 50% of the ion exchange capacity of the zeolite.

6. The process of claim 1 where the amount of potassium in the potassium exchanged zeolite is at least 90% of the ion exchange capacity of the zeolite.

7. A process for producing a substantially crack free ceramic article having less than 5% porosity and whose principal crystalline phase is a leucite/pollucite solid solution, comprising calcining a powder of a potassium and cesium coexchanged zeolite at a temperature of about 900° to about 1100° C. for a time effective to collapse the zeolite framework and provide an amorphous powder, the zeolite having a $SiO_2/Al_2O_3$ ratio of about 3.5 to about 7.5, a potassium content of greater than zero but less than 100% of the ion exchange capacity of the zeolite, a cesium content of greater than zero but less than 100% of the ion exchange capacity of the zeolite and the sum of the potassium and cesium content is at least 50% of the total ion exchange capacity of the zeolite; forming the amorphous powder into a shaped article and sintering the shaped article at a temperature of about 1150° to about 1400° C., for a time of about 0.5 to about 12 hours, thereby forming said ceramic article.

8. The process of claim 7 where the sintering is carried out at a temperature of about 1200° to about 1300° C.

9. The process of claim 7 where the zeolite is selected from the group consisting of zeolite Y, zeolite B, zeolite L, zeolite W and zeolite omega.

10. The process of claim 9 where the zeolite is zeolite Y.

11. The process of claim 7 where the sum of the potassium and cesium concentration in the co-exchanged zeolite is at least 90% of the ion exchange capacity of the zeolite.

12. A process for producing a substantially crack free ceramic article having less than 5% porosity and whose principal crystalline phase is a leucite/pollucite solid solution, comprising calcining a powder which is a mixture of a potassium exchanged zeolite and a cesium exchanged zeolite at a temperature of about 900° C. to about 1100° C. for a time effective to collapse the zeolite framework and provide an amorphous powder, the zeolite having a $SiO_2/Al_2O_3$ ratio of about 3.5 to about 7.5, the potassium exchanged zeolite having a potassium content greater than zero but less than 100% of the ion exchange capacity of the zeolite, the cesium exchanged zeolite having a cesium content greater than zero but less than 100% of the ion exchange capacity of the zeolite and the sum of the potassium and cesium content is at least 50% of the total ion exchange capacity of the zeolites; forming the amorphous powder into a shaped article and sintering the shaped article at a temperature of about 1150° to about 1400° C., for a time of about 0.5 to about 12 hours, thereby forming said ceramic article.

13. The process of claim 12 where the sintering is carried out at a temperature of about 1200° to about 1300° C.

14. The process of claim 12 where the zeolite is selected from the group consisting of zeolite Y, zeolite B, zeolite L, zeolite W and zeolite omega.

15. The process of claim 14 where the zeolite is zeolite Y.

16. The process of claim 12 where the sum of the potassium and cesium concentration is at least 90% of the total ion exchange capacity of the zeolites.

17. A process for producing a substantially crack free ceramic article having less than 5% porosity and whose principal crystalline phase is rubidium leucite, comprising calcining a powder of a rubidium exchanged zeolite, the zeolite having a $SiO_2/Al_2O_3$ ratio of about 3.5 to about 7.5, at a temperature of about 900° to about 1100° C. for a time effective to collapse the zeolite framework and provide an amorphous powder, forming the amorphous powder into a shaped article and sintering the shaped article at a temperature of about 1150° to about 1400° C., for a time of about 0.5 to about 12 hours, thereby forming said ceramic article.

18. The process of claim 17 where the sintering is carried out at a temperature of about 1200° C. to about 1300° C.

19. The process of claim 17 where the zeolite is selected from the group consisting of zeolite Y, zeolite B, zeolite L, zeolite W and zeolite omega.

20. The process of claim 19 where the zeolite is zeolite Y.

21. The process of claim 17 where the amount of rubidium in the rubidium exchanged zeolite is at least 50% of the ion exchange capacity of the zeolite.

22. The process of claim 17 where the amount of rubidium in the rubidium exchanged zeolite is at least 90% of the ion exchange capacity of the zeolite.

23. A process for producing a substantially crack free ceramic article having less than 5% porosity and whose principal crystalline phase is pollucite comprising calcining a powder of a cesium exchanged zeolite having a $SiO_2/Al_2O_3$ ratio of about 3.5 to about 7.5, at a temperature of about 900° to about 1100° C. for a time effective to collapse the zeolite framework and provide an amorphous powder, forming the amorphous powder into a shaped article and sintering the shaped article at a temperature of about 1150° to about 1400° C., for a time of about 0.5 to about 12 hours, thereby forming said ceramic article.

24. The process of claim 23 where the sintering is carried out at a temperature of about 1200° to about 1300° C.

25. The process of claim 23 where the zeolite is selected from the group consisting of zeolite Y, zeolite B, zeolite L, zeolite W and zeolite omega.

26. The process of claim 25 where the zeolite is zeolite Y.

27. The process of claim 23 where the concentration of cesium in the zeolite is at least 50% of the ion exchange capacity of the zeolite.

28. The process of claim 23 where the concentration of cesium in the zeolite is at least 90% of the ion exchange capacity of the zeolite.

29. A substantially crack free ceramic article having less than 5% porosity, having as its principal crystalline phase a leucite/pollucite solid solution and having an empirical formula expressed in terms of the metal oxides:

$$xK_2O:yCs_2O:zSiO_2:Al_2O_3$$

where x varies from about 0.01 to about 0.99, y varies from about 0.99 to about 0.01 and z varies from about 3.5 to about 7.5 except that when z is 7.5, y is greater than 0.19, the ceramic article characterized in that it has a coefficient of thermal expansion of about $2 \times 10^{-6}$ to about $27 \times 10^{-6}$ °C.$^{-1}$ over the range 50° to 700° C.

* * * * *